United States Patent [19]

Kinney, Jr. et al.

[11] Patent Number: 4,826,636
[45] Date of Patent: May 2, 1989

[54] MULTI-LEVEL FILM FILL INDUSTRIAL CROSS FLOW WATER COOLING TOWER

[75] Inventors: Ohler L. Kinney, Jr., Leawood; Thomas W. Bugler, III, Prairie Village, both of Kans.

[73] Assignee: The Marley Cooling Tower Company, Mission, Kans.

[21] Appl. No.: 100,916

[22] Filed: Sep. 25, 1987

[51] Int. Cl.$^4$ .............................................. B01D 47/00
[52] U.S. Cl. ................................... 261/23.1; 261/110; 261/112.1; 261/112.2; 261/DIG. 11
[58] Field of Search .................. 261/110, 112.1, 112.2, 261/DIG. 11, 23.1

[56] References Cited

U.S. PATENT DOCUMENTS

| | | | |
|---|---|---|---|
| 3,764,121 | 10/1973 | Fordyce | 261/DIG. 11 |
| 3,820,353 | 6/1974 | Shiraishi et al. | 261/DIG. 11 |
| 4,317,785 | 3/1982 | Dickey, Jr. et al. | 261/112.2 |
| 4,548,766 | 10/1985 | Kinney et al. | 261/DIG. 11 |
| 4,781,869 | 11/1988 | Wiltz | 261/109 |

FOREIGN PATENT DOCUMENTS 528938 11/1940 United Kingdom .

Primary Examiner—Bernard Nozick
Attorney, Agent, or Firm—Hovey, Williams, Timmons & Collins

[57] ABSTRACT

A crossflow cooling tower includes at least two separate packs of film fill which are both horizontally and vertically offset relative to each other. Each of the film packs has a height within a certain critical range of values, and presents a plurality of air passageways of lengths within a certain critical range. In addition, each pack is inclined from vertical to a degree within a certain range of values. Construction of a multilevel tower with film fill packs in accordance with the invention provides far greater cooling effectiveness than could be attained by, for instance, a single film fill pack or fill structure comprising a plurality of splash bars. A water distribution system directs separate streams of hot water to be cooled to a corresponding distribution basin laying atop each fill pack and nozzles within the floor of each basin are subjected to substantially equal heads so that the flow rates of the water dispersed to each pack are essentially equal.

11 Claims, 6 Drawing Sheets

MULTI-LEVEL FILM FILL INDUSTRIAL CROSS FLOW WATER COOLING TOWER

BACKGROUND OF THE INVENTION

1. Field of the Invention

This invention broadly relates to a crossflow cooling tower having two or more film fill packs located in vertically and horizontally offset relationship to each other, with a water distribution system which divides the water to be cooled into separate streams which are directed to respective upper water inlets of the packs. The invention includes the discovery that there are certain critical parameters for the relative dimensions of the film fill packs so that the effectiveness of the tower can be optimized; specifically, the height of each pack, the length of air travel through the pack and the inclination of the upright air inlet face of each pack should be within certain specific limits. The multi-level fill pack arrangement is especially advantageous as a replacement for splash type fill structure in an existing tower, and has been found to provide a substantial improvement in the duty of the tower.

2. Description of the Prior Art

One imprtant class of industrial water cooling towers has long been those of the mechanical draft crossflow type which have splash type fill structure comprising an arrangement of horizontally extending slats or splash bars. Initially, these crossflow towers had splash bars constructed of redwood because of its favorable cost to useful life ratio under the wet conditions which existed in the tower. Other materials were either more expensive or did not have the longevity attributes of redwood slats. Synthetic resin splash bars began to replace the wooden slats as the cost of redwood rose, and techniques of manufacture and prices of plastics made extruded shapes price competitive with wood.

During the era of wood splash bars for crossflow cooling towers, the first or installed cost of the tower including the splash bar contruction was of primary concern to the engineer during design of such towers, by virtue of the fact that relatively low electrical energy costs for powering the mechanically driven fans did not significantly enter into the overall equation of tower costs when initial as well as operating costs were calculated over the anticipated useful life of the tower.

However, as electrical energy costs have steadily increased over the years, selection and design of industrial water cooling towers has required a comprehensive evaluation of the projected operating costs over the life of the tower in addition to the capital expenses for construction and installation of the tower. An evaluation of future operating costs must also take into account anticipated increases in the price of energy due to inflation. Thus, when a tower owner is faced with a decision as to whether an existing tower should be replaced or reconstructed, the projected operating costs must be assessed along with installation expenses, both for a proposed new tower or for an existing tower having fill structure which must be replaced, in order to reach an advised decision with respect to building a new tower or repairing the old installation.

One alternative to constructing a new tower as a replacement for an existing unit is to change out the fill structure in order to provide a more cost effective means of bringing the hot water to be cooled into sensible and evaporative heat exchange relationship with cooling air directed through the tower by the associated fan structure. However, the fill structure must be more efficient than in the existing tower if the reconstruction is to be justified when operating costs are taken into account. Film fill structure has the potential of providing a more efficient operating package than splash type fill in the same cubic space, but film fill has normally been associated only with package and smaller commercial installations because of the higher initial cost of film fill. Recently, significant improvements have been made in the art of design and fabrication of film fill sheets and as a consequence the thermal effectiveness of the assembled pack has correspondingly increased, thus making installations of film fill packs even more economically competitive with splash type fill towers when the extended time operating expenses for the tower are factored into the calculations.

U.S. Pat. No. 4,548,766 dated Oct. 22, 1985 and assigned to the assignee of the present invention discloses a film fill pack constructed of a series of side-by-side vacuum formed film fill sheets. The fill sheets illustrated and described in U.S. Pat. No. 4,548,766 each have outwardly extending spacers which are complementally received in notches of spacers of the adjacent sheets in order to maintain the sheets in required horizontally spaced relationship.

However, a single film fill sheet pack is not normally a suitable direct substitution for the splash bars in the air-water interchange area of a larger industrial mechanical draft crossflow water cooling tower. One problem in this regard is that if the length of the fill pack is increased to accommodate a larger volume of water to be cooled, the increased cooling effectiveness of the film fill pack is such that a large part the heat transfer between the descending water and the crossflowing currents of air occurs within upper reaches of the fill pack, and a much smaller proportion of heat transfer takes place in the lower regions of the same. This is especially true in large industrial towers because the efficiency of the film fill pack is such that the descending water more closely approaches the wet bulb temperature of the incoming air at a higher elevation in the tower than water descending through a splash type fill structure of a similar tower. Consequently, less thermal interaction occurs in the remaining lower regions of the pack since the thermal driving force is directly proportional to the difference between the water temperature and the wet bulb temperature of the air.

One possible solution might be to increase the width of a film fill pack in an industrial crossflow cooling tower in an effort to improve the overall effectiveness of the tower. In this way, the hot water to be cooled could be distributed over a wider area in order to proportionately reduce the thickness of the water films descending over the sheets. However, such a solution would not overcome the problem of improving the cooling effectiveness of the fill pack within lower regions of the same. Furthermore, the increased horizontal dimension of the film fill pack would have a deleterious effect on static air pressure drop through the fill assembly and in the end, decrease the effectiveness of the film fill. Also, the addition of film fill to extend the width may not be cost effective if the cooling air has expended much of its cooling potential prior to entering the additional fill. Finally, because the film fill is more expensive than a series of splash bars in the same space, it is not cost effective to place film fill throughout the entire area that would normally be occupied by splash bars.

SUMMARY OF THE INVENTION

In accordance with this invention, a crossflow water cooling tower is provided with at least two separate packs of film fill located at different elevations within the tower framing and disposed in horizontally offset relationship relative to each other. It has been discovered that the multi-level film fill cooling tower provides superior thermal performance when each of the film fill packs is of dimensions within a range of certain critical parameters.

Optimization of the cooling effectiveness of the multi-level film fill cooling tower can be achieved by limiting the height of each fill pack to a value within the range of 10 feet to 32 feet, and providing horizontally extending air passageways through the pack of an overall length in the range of three feet to eight feet. In addition, each of the fill packs should be inclined in the range of about 4° to about 7° relative to vertical. In practice, good results have been observed when multi-level film fill packs constructed in accordance with these key parameters are employed in association with either mechanical draft or natural draft cooling towers.

A water distribution system directs separate streams of hot water to respective distribution basins lying atop a corresponding film fill pack. For instance, when two separate film fill packs of approximately equal height, equal width and equal length are provided within the air-water interchange section of a mechanical draft tower, the distribution system is constructed to divide the hot water to be cooled into streams having substantially equal flow rates which are delivered to the upper water inlets of repsective film fill packs. In cases where the film fill packs are not of equal height, water loadings may be adjusted accordingly so that the temperature of the cold water discharged from the lower end of each pack is essentially the same.

The present invention is particularly applicable for reconstruction and revitalization of older towers originally provided with a splash-type fill. An increase in cooling effectiveness of approximately 10-30% has been observed in practice after replacement of splash bar fill with multilevel film fill packs constructed in accordance with the invention.

DETAILED DESCRIPTION OF THE INVENTION

Figure 1:
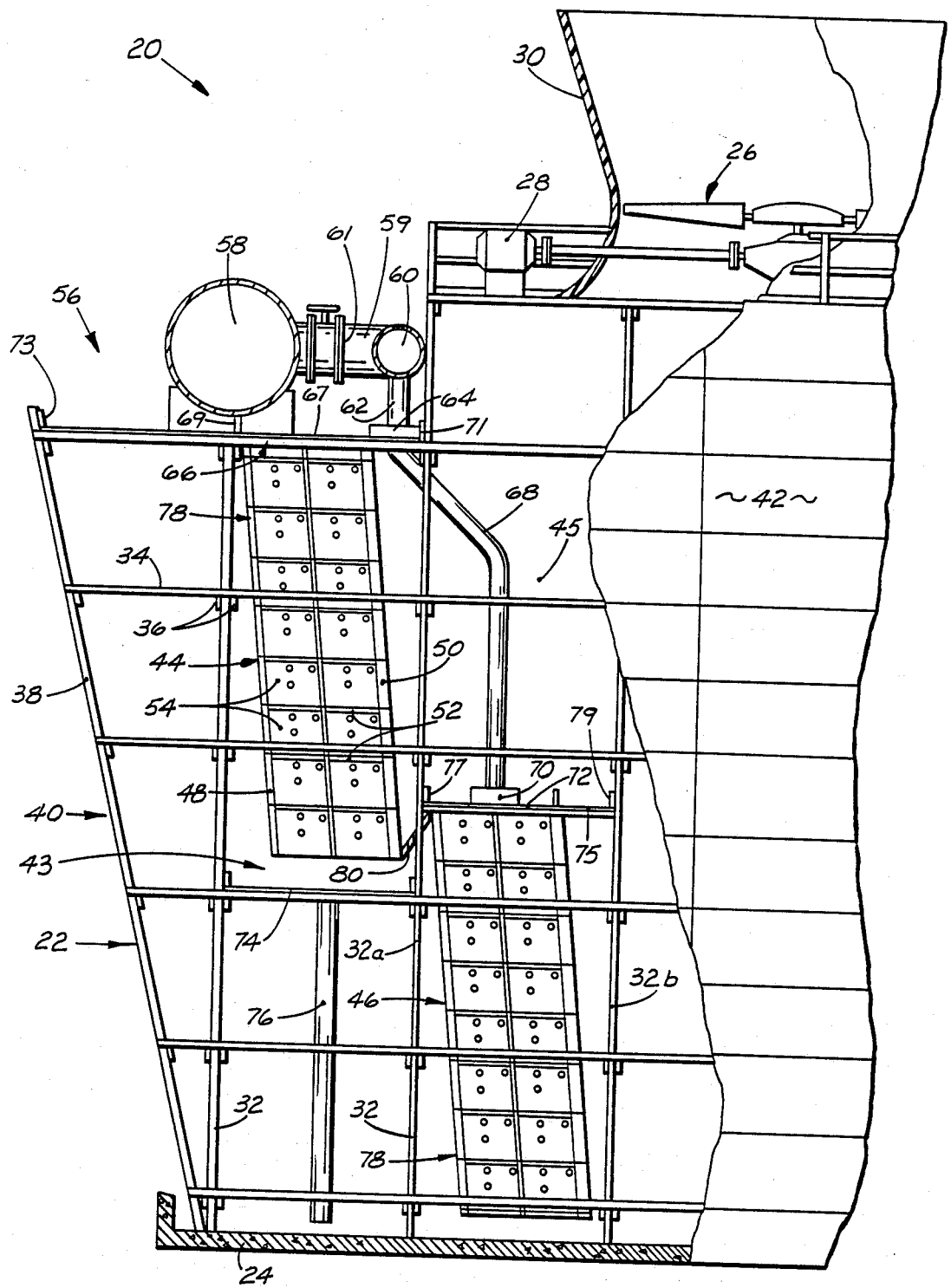
FIG. 1 is a fragmentary, elevational view of an industrial, mechanical draft water cooling tower with parts broken away in section to depict a multi-level film fill pack arrangement of the present invention which in this instance is comprised of two vertically and horizontally offset fill packs located on each side of the tower.

Referring to FIGS. 1-7, the industrial mechanical draft crossflow water cooling tower depicted therein is broadly designated by the numeral 20 and includes a framework 22 that rests atop a cold water collection basin 24. A fan 26 (FIG. 1) is driven by a motor 28 to draw currents of air into a central plenum of the tower 20 and discharge the air in a generally vertical direction through fan cylinder 30. It should be understood, however, that the following description of the invention is also applicable to hyperbolic or natural draft towers in addition to the tower 20 of mechanical draft type as is illustrated in the drawings for exemplary purposes only.

The framework 22 of the tower 20 comprises a number of spaced, vertical columns 32 that are crossed by horizontal transverse girts 34 which, in turn, are located above and carried by longitudinal girts 36 that extend in a horizontal direction perpendicular to the girts 34. In addition, a number of sloped columns 38 extend in an upright direction at an angle from vertical across an air inlet 40 located at the side of tower 20. Opposed sidewalls of the tower 20 are closed by casing panels 42 in the case of an opposed airflow tower as shown in FIG. 1; three sidewalls are provided for a single air inlet tower.

Referring now to FIGS. 1-6, fill structure for each air-water interchange section 43 of the tower 20 includes a first film fill pack 44 and a second film fill pack 46. Each of the packs 44, 46 is comprised of a series of thin, vertically extending sheets of material disposed in face to face relationship to each other and presenting a number of air passageways between the sheets for the flow of air therethrough in a direction from the air inlet 40 and toward a central plenum 45 of tower 20. The formed sheets of the packs 44, 46 preferably each present a repeating chevron pattern defining a series of zig-zag, serpentine, spaced ridges on opposed faces of the sheet with ridges on one face of the sheet defining grooves in an opposite face thereof and vice versa.

Preferably, the sheets of the film fill packs 44, 46 are similar to the film fill sheets described and illustrated in the aforementioned U.S. Pat. No. 4,548,766 in that each of the sheets is formed with a plurality of integral spacers which project in opposite directions from each sheet and which have notches that receive outer portions of the spacers of the next adjacent sheet so that the sheets are maintained in required horizontally spaced relationship relative to each other. Viewing FIG. 1, each of the packs 44, 46 is comprised of two separate, slightly spaced assemblies of film fill sheets, with an outer pack assembly having sheets presenting formed air inlet louvers along an outer edge 48 and the other pack assembly having sheets presenting formed, inclined drift eliminators 50 along an inner edge. Integral, horizontally extending corrugated sections 52 of each sheet cooperate with the same sections of adjacent sheets to distribute hot water over a central, chevron-patterned air-water contact zone 54 while also assisting in maintaining the requisite sheet spacing. The dual pack assembly of each pack 44, 46 is described in more detail in co-pending application Ser. No. 07/069,377 filed July 2, 1987 entitled "Plastic Fill Sheet for Water Cooling Tower with Air Guiding Sheet Spacers" and assigned to the assignee of the present invention. In the event synthetic resin film material is available to permit fabrication of the fill pack as a one piece assembly instead of dual packs 44, 46 as illustrated, equal results may be obtained.

The first film fill pack 44 is laterally offset (i.e., in a horizontal direction) from the second film fill pack 46 and is disposed at a higher elevation than the elevation of the second pack 46. Furthermore, a hot water distribution system 56 directs essentially separate streams of hot water to be cooled to each pack 44, 46 in order to attain greater overall cooling effectiveness in comparison to, for instance, a tower having a single film fill pack assembly extending completely along the vertical extent of the air inlet.

The water distribution system 56, in more detail, includes a main inlet header pipe 58 (FIG. 1) that is connected by means of one or more transverse conduits 59 having control valve 61 therein to a parallel somewhat smaller secondary conduit 60. A number of upstanding, horizontally spaced pipes 62 coupled to the secondary conduit 60 direct hot water received from inlet header pipe 58 to respective horizontally spaced splash boxes 64 disposed along the length of a hot water distribution basin 66 defined by the floor 67 of basin 66, and the transversely extending upright walls 69 and 71 respectively. In the case of a tower reconstruction, the wall 69 is added to restrict the overall size of the hot water distribution basin, which is normally delineated in part by the outermost upright wall 73. Water distribution nozzles within apertures in the floor portion 67 of the basin 66 function to uniformly disperse water over the upper water inlet face of the first film fill pack 44. In a reconstruction job, the orifices normally provided in the outboard section of the hot water distribution basin between walls 69 and 73 are plugged to preclude flow of hot water therethrough.

Again referring to FIG. 1, a plurality of angled, horizontally spaced downcomer pipes 68 are also coupled to the secondary conduit 60 between and spaced from adjacent pairs of the upstanding pipes 62. The downcomer pipes 68 each function to direct hot water to be cooled to a one of a number of corresponding splash boxes 70 that are located within a second hot water distribution basin 72 below basin 66 and commensurate in longitudinal length with the latter. However, basin 72 defined by the bottom floor 75 and upright end walls 77 and 79 respectively is carried by the columns 32a and 32b of FIG. 1 at a position intermediate hot water basin 66 and the underlying cold water basin 24. Nozzles located in orifices in the floor 75 of the basin 72 evenly disperse incoming hot water arriving from the downcomer pipes 68 to an upper water inlet face of the second film fill pack 46, of the same film sheet construction as described with respect to the film fill pack 44.

Each of the upstanding pipes 62 as well as the downcomer pipes 68 is advantageously provided with a venting device so that hot water discharged from the secondary conduit 60 is split into streams with essentially equal flow rates and any effects of siphoning are substantially precluded. In this manner, the flow rates of water directed to each of the distribution basins 66, 72 are essentially equal and the resultant heads of water on the nozzles of each basin 66, 72 are thereby uniform. In one example, the main inlet header 58 was of a size ranging from 48 inches to 60 inches in diameter, the secondary conduit 60 was 16 inches in diameter while the pipes 62, 68 were of a diameter ranging from six to eight inches.

Water descending through the first film pack 44 is discharged at the lower end thereof into a cold water collection sub-basin 74 (FIGS. 1-6) which is elevated with respect to the main cold water collection basin 24. One or more drain pipes 76 communicate with the sub-basin 74 for directing the cooled water to the main cold water basin 24. Water descending through the second film fill pack 46 is also discharged directly into the cold water collection basin 24 and mixes with the cold water exiting the drain pipes 76.

In accordance with the invention, it has been discovered that each of the film fill packs 44, 46 when constructed and arranged in a particular manner provides superior results in comparison to splash fill structures conventionally used in mechanical draft crossflow water cooling towers. More particularly, each of the film fill packs 44, 46 present air passageways which begin at the air inlet face 78 thereof and terminate at the air outlet face near eliminators 50 thereof. These passageways have a horizontal dimension in the range of about three feet to about eight feet in length. Better results have been observed, however, when the air passageways are of a horizontal length ranging from about four feet to about seven feet while best results have been observed when the air passageways are of a length in the range of about 4.75 feet to about 6.75 feet. The air passageways extend in a generally horizontal direction in transverse relationship to the direction of the travel of the water descending through the respective film fill packs 44, 46.

Moreover, the air inlet face 78 (FIG. 1) of each of the film fill packs 44, 46 is inclined in the range of about 4° degrees to about 7° relative to vertical. Better results are attained, though, when the inclination of the air inlet face 78 relative to vertical is in the range of about 4.75° to 5.5°.

In addition, it is also important that the projected height of each film fill pack 44, 46 is in the range of about 10 feet to abut 32 feet. Better results are realized, however, when the vertical projected height of each fill pack 44, 46 is in the range of about 12 feet to about 21 feet.

Discovery of the superior results afforded by use of the critical parameters set forth above was attained by initially ascertaining the optimum values for the length of air travel, or air passageways through the fill packs. To this end, a series of tests was conducted and a graphical representation of tower performance versus the length of the air passageways was plotted; the graph revealed that the best incremental improvement in cooling effectiveness occurred as the air passageways were incrementally increased in length to values within the range of about three feet to about eight feet. Greater cooling of the water occurred as the width of the film fill packs was further increased to cause the air passageways to be of a length greater than eight feet, but the increase in effectiveness was not incrementally as great as the increase in effectiveness observed when the length of the air passageways was in the range of three feet to eight feet. That is, the slope of the curve obtained by plotting cooling effectiveness versus air travel or air passageway length declined once the passageways were increased to a length greater than eight feet.

From the graph obtained by plotting performance versus air travel distance, it was also observed that the optimum length of air travel distance for film fill packs of mechanical draft towers was 4.5 feet, while the optimum distance for air travel through film fill packs of natural draft towers was 6.75 feet. Next, a second series of tests was conducted for both mechanical and natural draft towers, with the width of the fill packs being fixed so that the distance of air travel within packs for the mechanical draft tower was 4.5 feet and the distance of air travel within packs for the natural draft tower was 6.75 feet.

Figure 7:
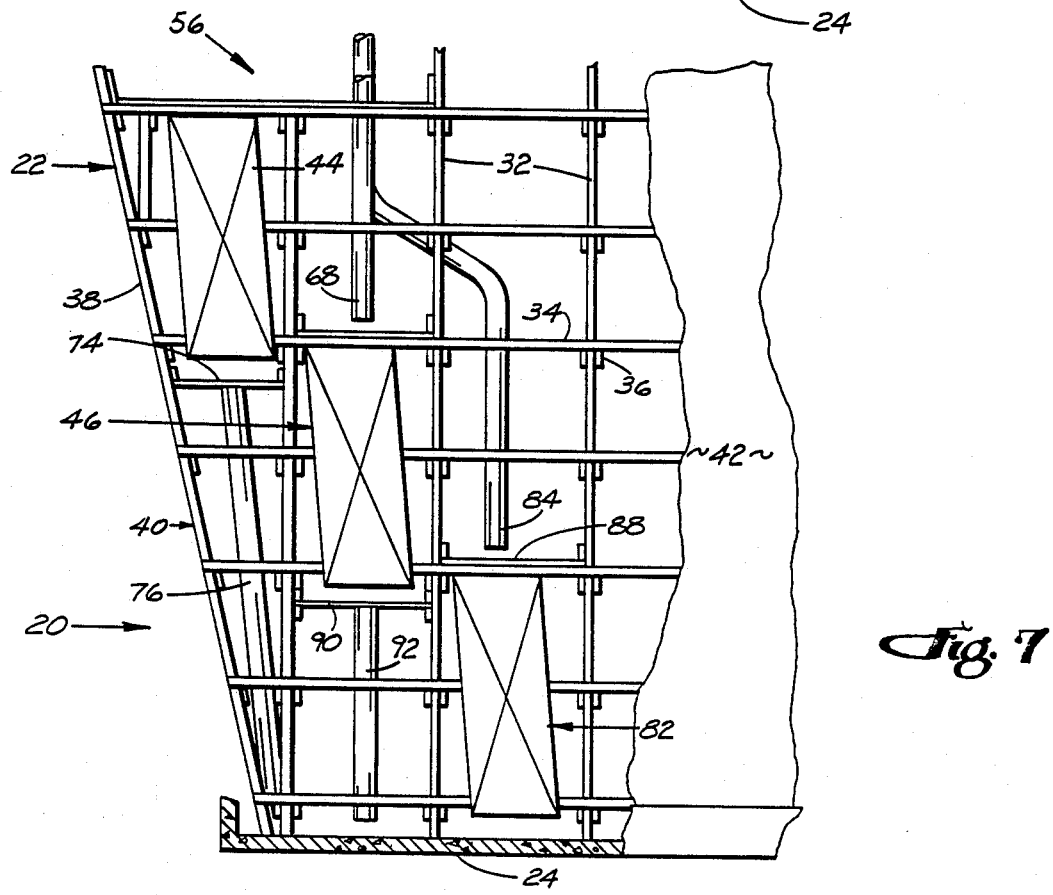
FIG. 7 is a view somewhat similar to FIG. 6 except that the fill pack arrangement comprises three staggered, offset packs each of a height smaller than the film fill packs illustrated in FIG. 6.
Figure 8:
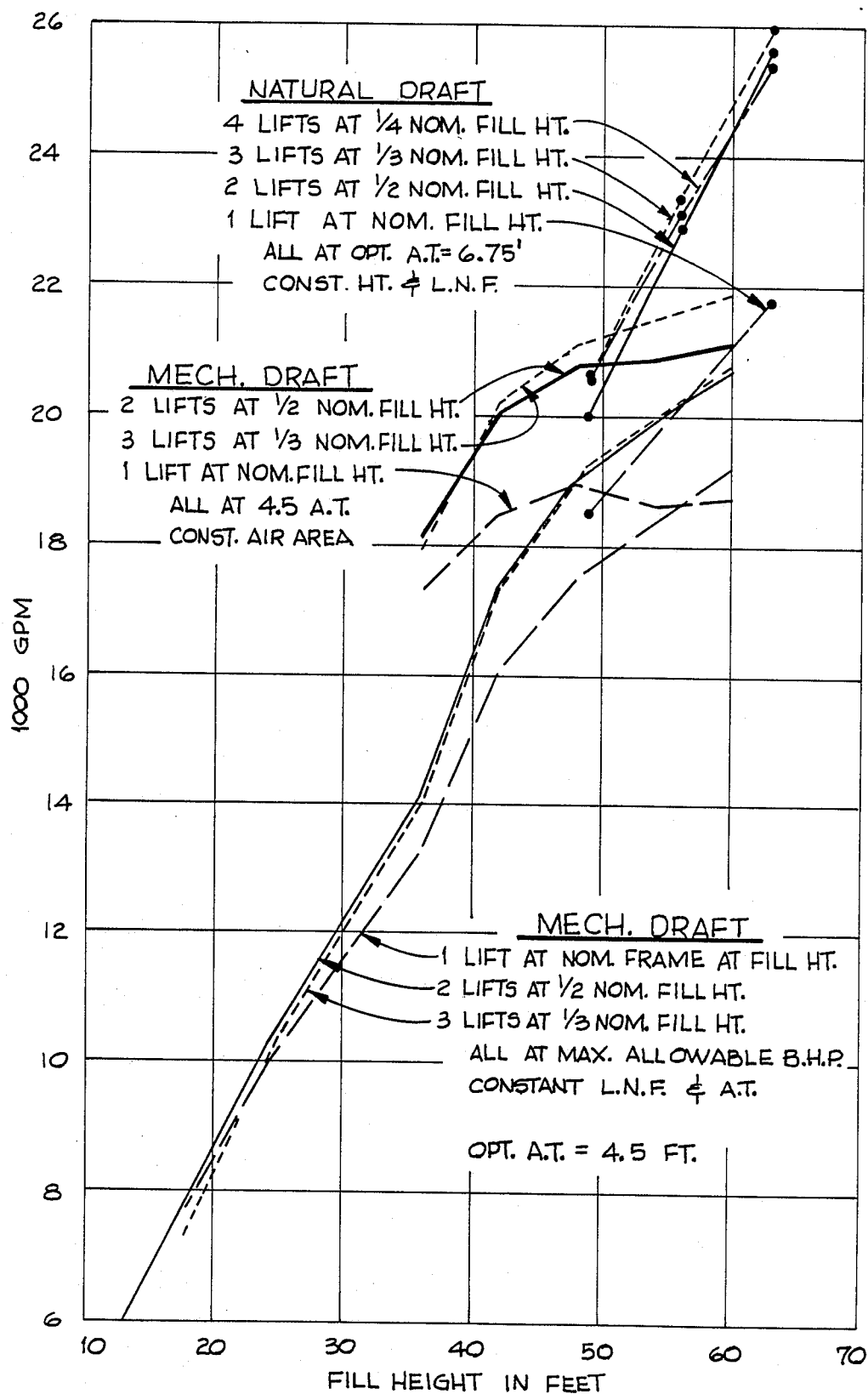
FIG. 8 is a graphical representation of for exemplary test data showing the total height of fill necessary to achieve equivalent cooling of the water at various water flow rates, and including a comparison of results obtained using a multi-level film fill pack arrangement in accordance with the invention as opposed to a single film fill pack.

From the second series of tests, the graph that is illustrated in FIG. 8 was constructed. During certain of the tests for a mechanical draft tower, the length of each of the fill packs 44, 46 (i.e., in a direction perpendicular to the plane of the paper of FIGS. 1–7) was held constant, and performance data of the tower was recorded as the total vertical projected height of the fill pack(s) was varied. Tower performance, in this instance, was measured by adjusting the flow rate of water through the fill packs until the temperature of the cold water exiting the packs was equal to a certain fixed value. Other conditions were held constant during the tests, including the temperature of the incoming hot water and the wet bulb temperature of the air entering the pack. In the lower set of curves of FIG. 8, the term "Const. L.N.F. and A.T." refers to the fact that the lineal net feet of the fill pack and the air travel through the fill packs was held constant. The terms "lineal net feet" in this sense is the equivalent to the overall length of the fill packs (i.e. in a direction perpendicular to the plane of the page in FIGS. 1–7 minus the lengths of any portions of the fill pack that are adjacent an obstruction (such as an upright column) which significantly blocks the flow of air through that portion of the fill packs.

The set of curves shown in the lower portion of FIG. 8 reveals that a film fill pack arrangement comprised of two separate, vertically and horizontally offset lifts or packs provides superior performance in comparison to fill structure of a single film fill pack when the total projected or nominal height of the fill packs is in the range of 20 feet to about 60 feet. In other words, if the total height of the fill structure is to be above 20 feet, better results were observed when two separate packs were provided, each having a height of 10 feet or greater. In this regard, it should be understood that the nominal or total projected fill height is the sum of the projected height of each fill pack 44, 46 which in the case of FIG. 1 is a distance greater than the projected vertical extent of both packs 44, 46 combined due to the overlapping relationship of the same.

Again referring to the lower set of curves in FIG. 8, it can also be observed that if the total height of fill is above 47 feet or thereabove, better tower effectiveness is attained when three fill packs rather than two are employed. Of course, somewhat different results are observed when the length of the air passageways or air travel distance through the packs is of a dimension other than 4.5 feet which was selected for the tests represented by the data in FIG. 8.

Additional tests were undertaken to determine effectiveness of a multi-level fill pack arrangement when the total area of the air inlet faces of the film fill packs was held constant as well as the length of the air passageways throughout the packs. For these tests, the length of the fill packs (i.e., in a direction perpendicular to the plane of the page of FIGS. 1–7) was varied in inverse relationship to the projected, total height of the fill packs. The results of the test as shown in the middle regions of FIG. 8 indicate that two fill packs offered greater effectiveness when total fill heights were less than about 41 feet, while three packs offered better performance when the total fill height was somewhat greater than 41 feet. In the test conducted, both the dual fill pack arrangement and the triple fill pack arrangement performed in superior fashion in comparison to the pack arrangement which consisted of only a single pack.

The upper set of curves depicted in FIG. 8 correspond to data obtained during tests conducted for a natural draft tower. In these tests, the air travel distance or length of air passageways (A.T.) through the pack was held constant at a value of 6.75 feet, and again other factors such as the temperature of the incoming hot water and the wet bulb temperature of the incoming air were fixed. During these tests, it was observed that multiple fill pack arrangements offered a substantial benefit in comparison to film structures of a single pack, and that a pack arrangement consisting of three vertically and horizontally offset packs provided somewhat superior performance than fill structures consisting of two or four packs within the range of fill heights tested. In the upper set of curves shown in FIG. 8, the notation "Const. H.T. and L.N.F." refers to the fact that the overall height of the tower was held constant, and that the lineal net feet of the fill packs was held constant.

Figure 2:
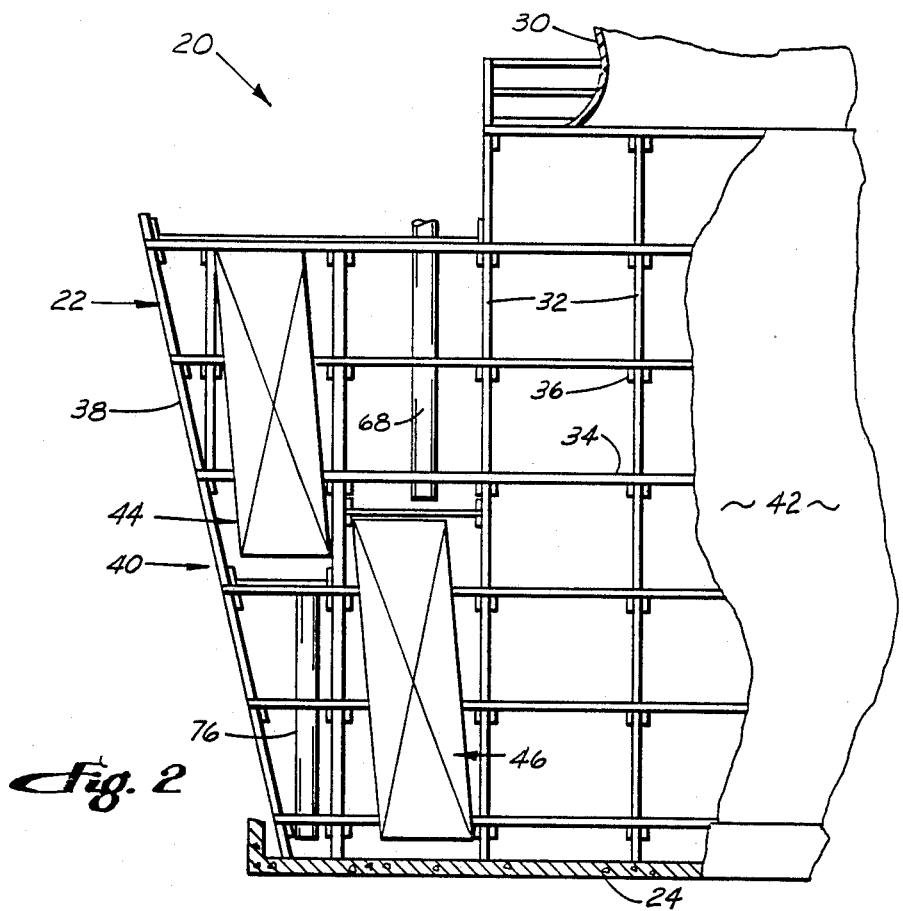
FIG. 2 is a reduced view somewhat similar to FIG. 1 but showing the disposition of the two film fill packs within the framework of a somewhat larger tower.

A comparison of FIGS. 1–6 provides insight as to the placement of the fill fill packs 44, 46 within the tower 20 in accordance with the size and disposition of the framework 22 of the latter. In FIG. 1, the packs 44, 46 are located in adjacent bays btteeen the columns 32 in slightly overlapping relationship. An inclined baffle 80 between the lower inboard corner of fill pack 46 and the upper outboard corner of pack 46 precludes air flowing past the upper part of pack 46 in bypassing relationship. Alternatively, the baffle may be a vertical panel in the plane of the adjacent column 32a (FIG. 1) extending between the cold water basin 74 therebelow. FIG. 2 depicts placement of the film fill packs 44, 46 within framework 22 that is equal in height but somewhat larger in horizontal dimension than the framework 22 depicted in FIG. 1. The downcomer pipes 68 serving the second film fill pack 46 in FIG. 2 are straight in contrast to the angled configuration of the downcomer pipes 68 provided for the fill pack arrangement depicted in FIG. 1. In like manner to fill pack arrangement of FIG. 1, the configuration of FIG. 2 should include an upright baffle (not shown) presenting air from bypassing the upper part of the full pack 46 as shown in FIG. 2.

Figure 3:
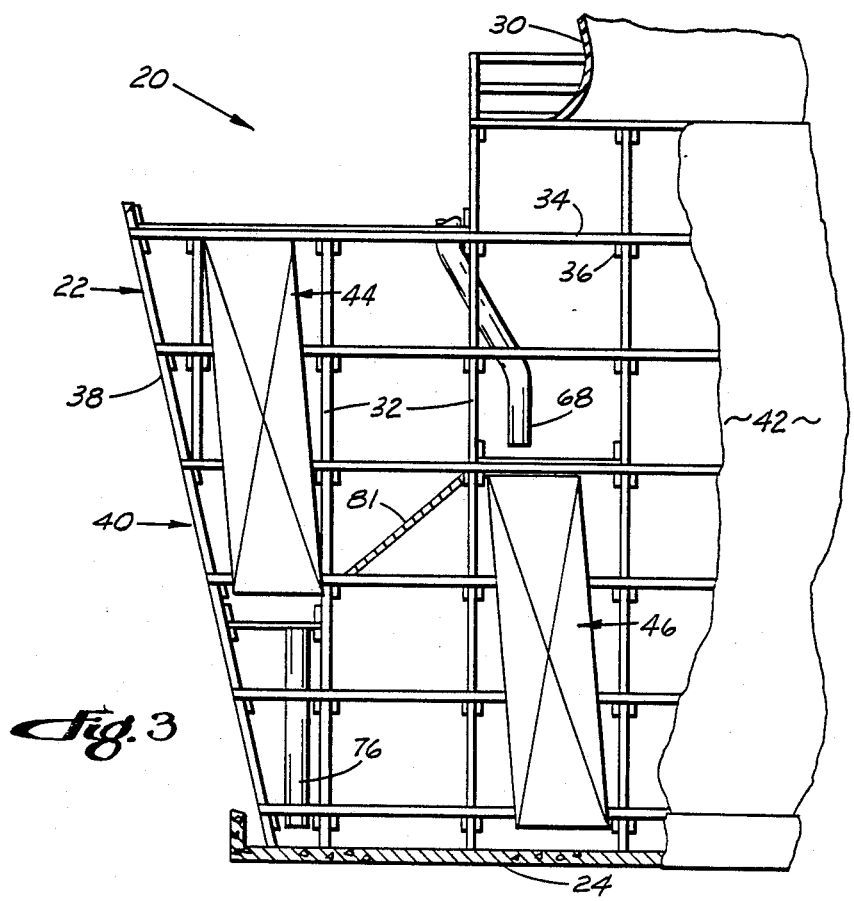
FIG. 3 is a view of a tower similar in size to the tower depicted in FIG. 2 and shows a fill pack arrangement wherein two overlapping packs are separated by an intermediate bay presented by the tower framework.

In FIG. 3, the tower framework 22 is essentially the same size as the framework 22 depicted in FIG. 2, but in this case the projected height of each pack 44, 46 is greater than the height of the corresponding packs 44, 46 in either of FIGS. 1 or 2. The packs 44, 46 in FIG. 3 are separated by an intermediate bay, and an inclined baffle 80 is provided to substantially prevent bypassing of air. It has been found that the inclination of the baffle 80 should be less than 45° from horizontal so that the flow of air into the tower 20 is not substantially impeded.

Figure 4:
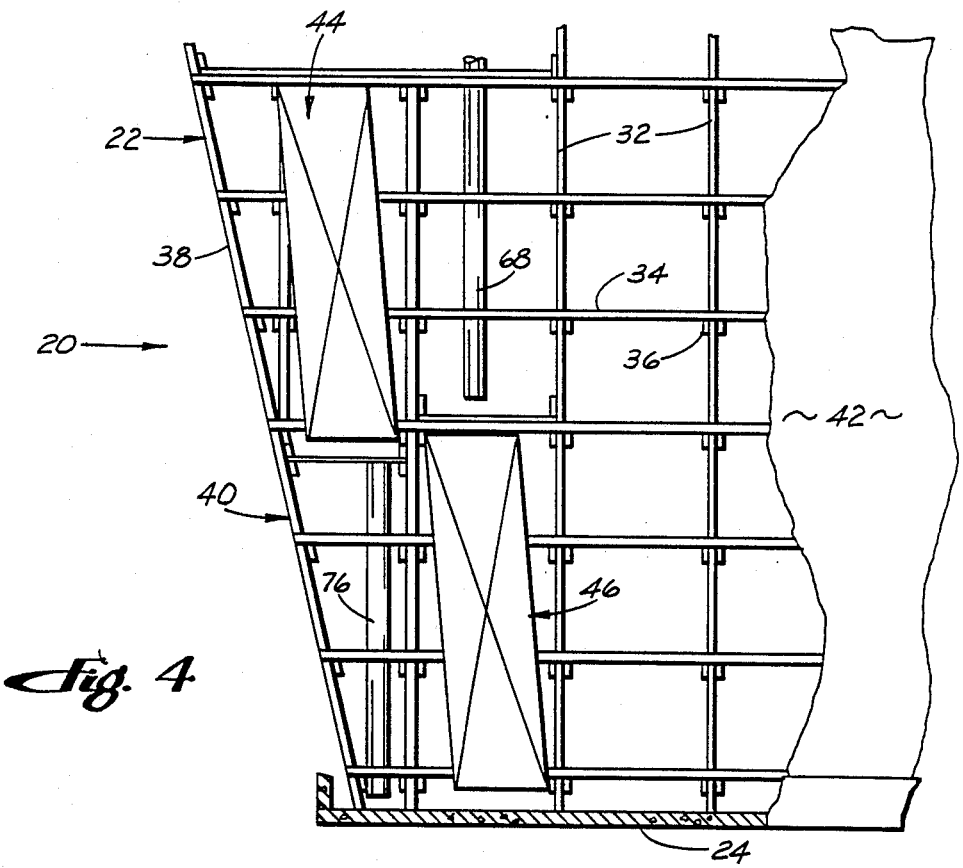
FIG. 4 is an illustration of a multi-level film fill pack arrangement in accordance with the invention within framework of a tower somewhat larger in size than the towers depicted in FIGS. 1-3.

The tower 20 illustrated in FIG. 4 has framework 22 of a height greater than the corresponding framework 22 shown in FIG. 3, although the packs 44, 46 located in adjacent bays of the tower 20 of FIG. 4 are a height equal to the height of the packs 44, 46 shown in FIG. 3.

Figure 5:
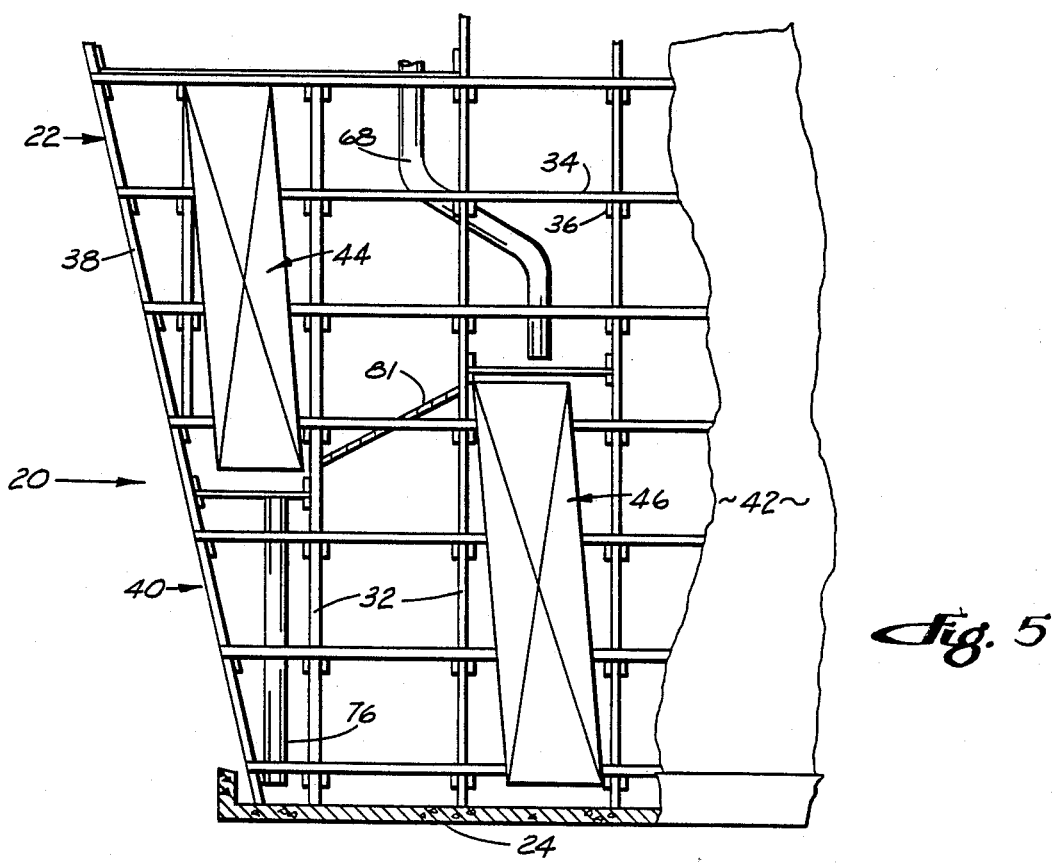
FIG. 5 is a view of a tower similar to the tower shown in FIG. 4 except that the fill packs are taller and are separated by an intermediate bay of the tower framework.

In FIG. 5, the height of the packs 44, 46 is greater than the height of the corresponding packs 44, 46 shown in FIG. 4 while the framework 22 of FIG. 5 is substantially identical in size to the size of the framework 22 illustrated in FIG. 4. The packs 44, 46 in FIG. 5 are separated by an intermediate bay defined by columns 32 to enable air to flow in unimpeded fashion through all regions of the packs 44, 46; also, baffle 80 is provided to substantially preclude bypassing air through the vacant bay and around the packs 44, 46.

Figure 6:
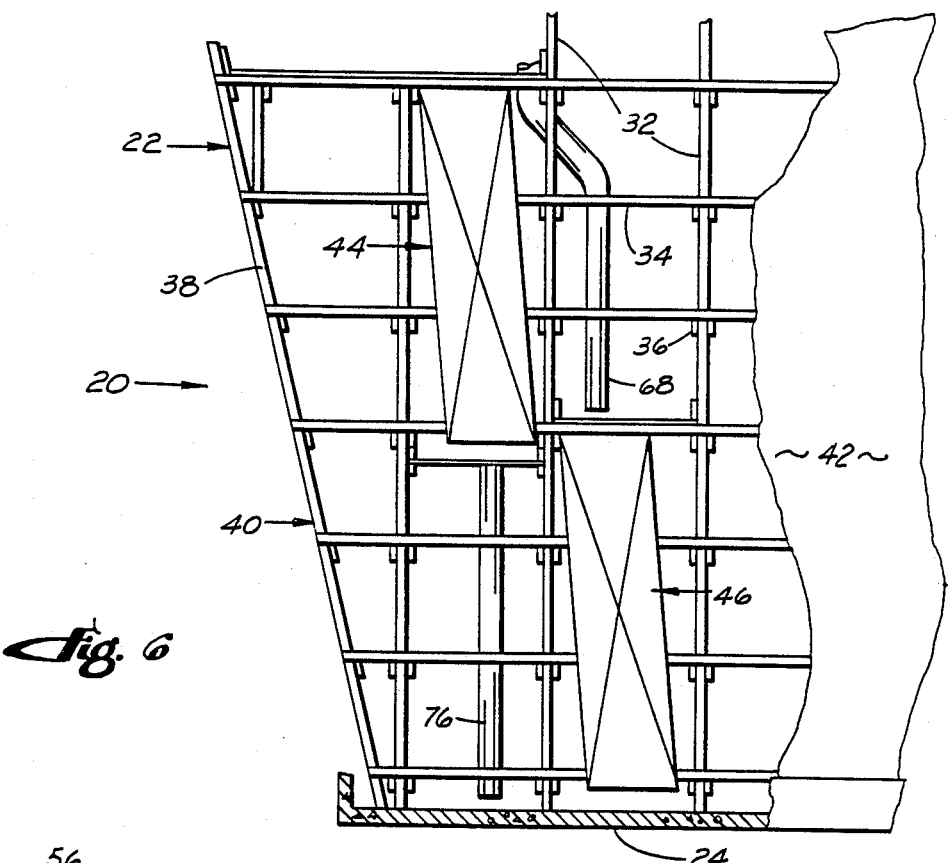
FIG. 6 is an illustration of a multi-level film fill pack tower in accordance with the invention having framework somewhat smaller than the framework of the tower shown in FIG. 4.

The tower 20 depicted in FIG. 6 has framework 22 of equal height but of somewhat smaller horizontal dimension than the framework 22 shown in FIG. 5. In addition, the height of the packs 44, 46 is equal to the height of the packs 44, 46 shown in FIG. 4. The packs 44, 46 in FIG. 6 are located away from the tower inlet face 40 next to the sloped columns 38 in similar orientation to the disposition of the packs 44, 46 shown in FIG. 1.

The multi-level film fill cooling tower 20 illustrated in FIG. 7 includes first and second film fill packs 44, 46 as well as a third film fill pack 82 disposed below packs 44, 46 and above main cold water collection basin 24. Each of the fill packs 44, 46, 82 are vertically and horizontally offset from each other and present a total projected vertical height and air passageways of dimensions within the aforementioned critical ranges. Also, each of the packs 44, 46, 82 is inclined from vertical to a degree within the critical ranges set forth above.

In all instances, the thermal performance required of specific fill packs 44, 46 for a particular tower dictates the overall height, width and depth of the packs. Consequently, if the dimensions of an existing tower where splash fill is to be replaced with film packs as described herein, will not accommodate the film fill in essentially nonoverlapping relationship as shown for example in FIGS. 4, 6 and 7, the other alternate placements of such fill packs as depicted in FIGS. 1, 2, 3 and 5 may be used.

Figure 9:
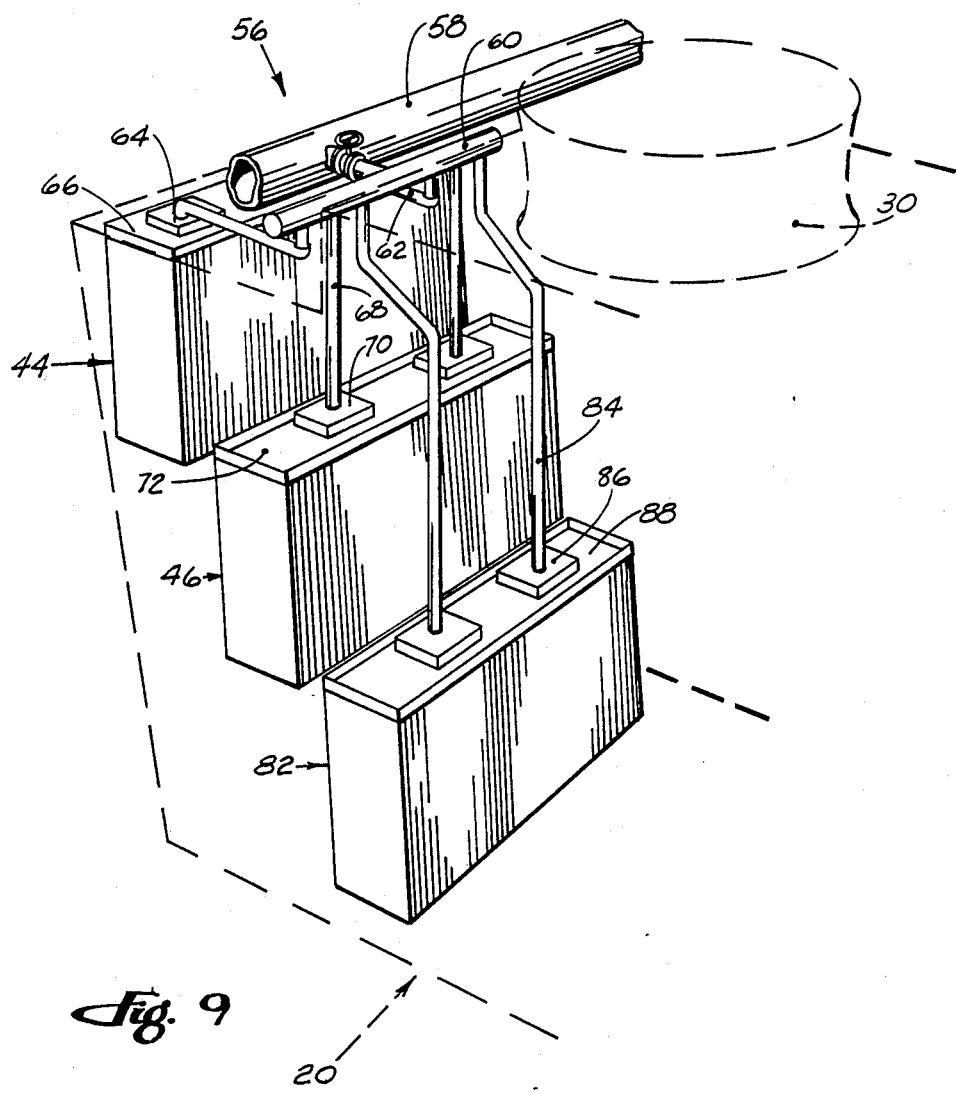
FIG. 9 is a perspective, fragmentary view of the three level film fill pack arrangement depicted in FIG. 7 and a water distribution system therefor, with the outline of the tower being depicted in dashed lines.

The hot water distribution system 56 of the tower 20 shown in FIG. 7 is more fully illustrated in FIG. 9. In this case, the pipes 62 serving the hot water distribution basin 66 overlying the first film fill pack 44 are of an angular configuration while the downcomer pipes 68 serving the hot water distribution basin 72 for the second film fill pack 46 are straight. In addition, a third set of downcomer pipes 84, located between adjacent pairs of the pipes 62 and the pipes 68, direct water to splash boxes 86 (shown only in FIG. 9) which in turn are located within a third hot water distribution basin 88 lying atop the third film fill pack 82. Water discharged from the third film fill pack 82 exits directly into the main cold water collection basin 24, and a second cold water collection sub-basin 90 is provided immediately below the second film fill pack 46 for receiving water from the latter and directing the same through drain pipes 92 into the main cold water collection basin 24.

It is also possible and within the scope of the invention to vary the heights of the film fill packs so that, for instance, the first film fill pack presents a projected height greater than the second film fill pack 46. In this case, water loadings on the respective packs are adjusted so that the temperatures of the cold water discharged from the respective packs are approximately equal.

In practice, the drift eliminator structure normally provided adjacent splash type fill structure is not needed and may be removed during installation of the multi-level fill pack arrangement in an existing tower framework, since the packs 44, 46 are provided with integral drift eliminator structure along edges 50. The external air inlet louvers along air inlet face 40, while also not necessary, may optionally be retained for aesthetic purposes.

We claim:

1. A multi-level film fill crossflow water cooling tower comprising:

a first film fill pack comprised of a series of thin, side-by-side sheets of material presenting a number of air passageways for the flow of air therethrough;

a second film fill pack comprised of a series of thin, side-by-side sheets of material presenting a plurality of air passageways therethrough;

said first fill pack being laterally offset from said second fill pack and being disposed at an elevation higher than the elevation of said second fill pack;

means for simultaneously distributing essentially separate streams of hot water to be cooled to a respective one of said first fill pack and said second fill pack, said distribution means including structure for delivering water to be cooled directly into the first fill pack and downcomer pipe means extending across the air outlet face of the first fill pack for delivering water to be cooled to the second fill pack without significantly impeding egress of air from the first fill pack, each of said first fill pack and said second fill pack presenting an air inlet face which is inclined in the range of about four degrees to about seven degrees relative to vertical, said air passageways of said first fill pack and said second fill pack presenting respective flow paths completely through the corresponding pack of lengths in the range of about three feet to about eight feet, said first fill pack and said second fill pack each having a height within the range of about ten feet to about thirty-two feet a cold water collection sub-basin positioned below the first fill pack for gravitational delivery of water thereto discharged from the lowermost and of the first fill pack; and drain pipe means connected to the sub-basin and extending across the air inlet face of the second fill pack for delivering cold water collected in the sub-basin to the main cold water collection basin without significantly impeding ingress of air into the second fill pack.

2. The invention as set forth in claim 1, wherein said height of each of said first fill pack and said second fill pack is in the range of about 12 feet to about 21 feet.

3. The invention as set forth in claim 1, wherein said flow paths of said air passageways are of a length within the range of about four feet to about seven feet.

4. The invention as set forth in claim 1, wherein said air inlet faces of said first film pack and of said second film pack are inclined in the range of about 4.75 degrees to about 5.5 degrees relative to vertical.

5. The invention as set forth in claim 1, wherein said first fill pack and said second fill pack each have heights within the range of about 12 feet to about 21 feet, and said flow paths of said air passageways of each of said first fill pack and said second fill pack are of a length in the range of about four feet to about seven feet.

6. The invention as set forth in claim 1, wherein said tower includes a fan for mechanically inducing the flow of air therethrough, and said flow paths of said air passageways of said first fill pack and said second fill pack have a length of about 4.5 feet.

7. The invention as set forth in claim 1, wherein said tower is of a natural draft type and said flow paths of said air passageways of said first fill pack and said second fill pack have a length of about 6.75 feet.

8. The invention as set forth in claim 1, wherein said first film fill pack is laterally spaced from said second film fill pack; and including a baffle extending from a lower portion of said first film fill pack and toward an upper portion of said second film fill pack for substantially precluding the flow of air in bypassing relationship to both packs.

9. The invention as set forth in claim 1; and including a third film fill pack comprised of a series of thin, side-by-side sheets of material presenting a number of air passageways for the flow of air therethrough, said third film fill pack being laterally offset from said second film fill pack and said first film fill pack, said third film fill pack being disposed at an elevation lower than the elevation of said first film fill pack and said second film fill pack.

10. The invention as set forth in claim 9; and including means for distributing hot water to be cooled to said third film fill pack in a stream that is essentially separate from said streams of hot water distributed to said first film fill pack and said second film film pack.

11. The invention as set forth in claim 9, wherein said third film fill pack presents an air inlet face which is inclined in the range of about 4° to about 7° relative to vertical, said air passageways of said third fill pack presenting respective flow paths completely through the third fill pack of lengths in the range of about 3 feet to about 8 feet, said third fill pack having a height within the range of about 10 feet to about 32 feet.

* * * * *